(12) United States Patent
Heizmann

(10) Patent No.: US 7,984,214 B2
(45) Date of Patent: Jul. 19, 2011

(54) DATA BUS INTERFACE WITH INTERRUPTIBLE CLOCK

(75) Inventor: Friedrich Heizmann, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 12/223,306

(22) PCT Filed: Jan. 11, 2007

(86) PCT No.: PCT/EP2007/050261
§ 371 (c)(1),
(2), (4) Date: Jul. 28, 2008

(87) PCT Pub. No.: WO2007/085532
PCT Pub. Date: Aug. 2, 2007

(65) Prior Publication Data
US 2009/0024781 A1    Jan. 22, 2009

(30) Foreign Application Priority Data
Jan. 30, 2006   (DE) .................. 10 2006 004 346

(51) Int. Cl.
*G06F 13/42* (2006.01)
*G06F 13/00* (2006.01)
*G06F 1/12* (2006.01)
*G06F 1/04* (2006.01)

(52) U.S. Cl. ......... 710/105; 711/154; 713/401; 713/600

(58) Field of Classification Search .................. 710/105; 711/154; 713/401, 600
See application file for complete search history.

(56) References Cited

U.S. PATENT DOCUMENTS
4,545,030 A * 10/1985 Kitchin .................. 713/601
(Continued)

FOREIGN PATENT DOCUMENTS
DE           19642265 C1   10/1996
(Continued)

OTHER PUBLICATIONS

Philips: "The I2C-bus specification Version 2.1" Philips Semiconductors Product Specification, Jan. 2000, pp. 1-46, XP002218697.
(Continued)

*Primary Examiner* — Mark Rinehart
*Assistant Examiner* — Christopher A Daley
(74) *Attorney, Agent, or Firm* — Robert D. Shedd; Jeffrey M. Navon

(57) ABSTRACT

In a data bus with asynchronous data transmission via a clock and a data line, the transmitted data are ascertained by sampling with a multiple of the data rate of the data bus. Sampling is done in this case with a clock which is not synchronous with the asynchronous clock of the data bus. For avoiding interferences which develop due to the unnecessary operation of the interface circuit with a high frequency clock when no data are currently transmitted, a control circuit is provided for detecting the beginning and the end of a data transmission. Only at the beginning of a data transmission, the interface circuit will be supplied with the required clock. After the end of the data transmission, the clock for the interface circuit will be switched off again. The control circuit is preferably designed as a state machine which reacts, without the need for clock signals, to the states on the data and clock line of the data bus.

7 Claims, 3 Drawing Sheets

U.S. PATENT DOCUMENTS

| | | | | |
|---|---|---|---|---|
| 5,155,840 | A * | 10/1992 | Niijima | 713/400 |
| 5,457,660 | A * | 10/1995 | Ito | 365/228 |
| 5,598,112 | A * | 1/1997 | Phillips | 326/93 |
| 5,878,234 | A * | 3/1999 | Dutkiewicz et al. | 710/110 |
| 5,903,737 | A * | 5/1999 | Han | 710/100 |
| 6,032,178 | A | 2/2000 | Bacigalupo | |
| 6,049,883 | A * | 4/2000 | Tjandrasuwita | 713/322 |
| 6,112,072 | A | 8/2000 | Stiegler | |
| 6,232,820 | B1 * | 5/2001 | Long et al. | 327/374 |
| 6,246,264 | B1 * | 6/2001 | Johnson | 326/93 |
| 6,530,029 | B1 * | 3/2003 | Metchev | 713/500 |
| 6,745,337 | B1 * | 6/2004 | Trivedi et al. | 713/400 |
| 6,799,233 | B1 * | 9/2004 | Deshpande et al. | 710/110 |
| 6,920,572 | B2 * | 7/2005 | Nguyen et al. | 713/322 |
| 6,968,472 | B2 * | 11/2005 | Fernald | 713/400 |
| 7,010,709 | B2 * | 3/2006 | Nakatsuhama et al. | 713/322 |
| 7,069,359 | B1 * | 6/2006 | Nishimoto | 710/100 |
| 7,174,473 | B2 * | 2/2007 | Musumeci et al. | 713/400 |
| 2001/0022824 | A1 * | 9/2001 | Araki | 375/360 |
| 2003/0107909 | A1 * | 6/2003 | Nakamura | 365/63 |
| 2005/0256986 | A1 * | 11/2005 | Kim et al. | 710/110 |
| 2007/0074059 | A1 * | 3/2007 | Abernathy et al. | 713/500 |

FOREIGN PATENT DOCUMENTS

| | | |
|---|---|---|
| DE | 19642265 | 1/1998 |
| DE | 102005041895 | 3/2007 |
| DE | 102005041895 A1 | 9/2007 |
| EP | 0929041 | 7/1999 |
| EP | 0929041 A2 | 7/1999 |
| EP | 0977125 | 2/2000 |
| GB | 2246687 | 2/1992 |
| GB | 2313987 | 12/1997 |

OTHER PUBLICATIONS

Search Report Dated Apr. 25, 2007.

DE Search Report.

* cited by examiner

DATA BUS INTERFACE WITH INTERRUPTIBLE CLOCK

This application claims the benefit, under 35 U.S.C. §365 of International Application PCT/EP2007/050261, filed Jan. 11, 2007, which was published in accordance with PCT Article 21(2) on Aug. 2, 2007 in English and which claims the benefit of German patent application No. 10 2006 004 346.4, filed Jan. 30, 2006.

The invention relates to a data bus interface, in particular to an interface for an I2C- or Inter IC bus in which the clock signal is interruptible.

Data bus interfaces like the above mentioned I2C bus are known as the industry standard and used in great numbers. The I2C bus is specified as an asynchronous data bus in which one data line and one clock line are sufficient for the transmission of data. The beginning and the end of a data transmission is indicated by corresponding states on the data and the clock line. The data transmission of individual bits is performed with each respective clock cycle on the clock line, the clock rate being specified by the device which initiated the data transmission. Thus, it can happen that the data clock is not synchronous with a clock existing at the receiver. This type of interface therefore is also called an asynchronous interface.

Today, digital integrated circuits are usually produced by means of integrated design tools, with existing blocks for different functions being imported from libraries and connected. Since these design tools are exclusively conceived for the implementation of synchronous logic, the integration of asynchronous functions—like the above mentioned asynchronous data interface—is not possible within the established tool flow. In the accordingly necessary implementation without tool support, problems may arise for the timing of the asynchronous data interface itself and also in connection with the rest of the integrated circuit. To ensure safe operation of the integrated circuit—despite these timing problems—considerable design efforts would be required which is undesirable. In order to be able to still use an asynchronous data interface, function blocks are available in the libraries which emulate the asynchronous data interface by means of a synchronous architecture. When receiving asynchronously transmitted data, the states on the clock and data lines are sampled by means of oversampling at a multiple of the data rate. The asynchronous signal can then be determined from the multiplicity of sampling values.

In such a synchronous integrated circuit, a plurality of elements is each simultaneously switched with the system clock. The resulting current flow generates so-called digital noise over a large frequency range and, moreover, increases the power consumption of the circuit even if the corresponding circuitry part is not in use.

In integrated circuits—in particular in those circuits which have to process RF signals at low levels—it is desirable to avoid any interference of the useful signals by other signals. These other signals can also be clock signals which are required for the operation of the integrated circuit. It is thus common to apply clock signals only to those circuitry parts which must be active to perform the function of the integrated circuit. It frequently happens that a circuit is only addressed via an interface after switching on or when parameters must be changed. Most of the time, the interface is not required to be active. In that case, the clock for the interface can be switched off if not used for communication. However, special precautions must be taken to be able to detect an externally initiated connection setup so that no parts of the transmitted data get lost while the interface is not yet ready to receive the data.

It is, therefore, desirable to present a circuit which only provides the clock required for the operation of an interface if the interface is actually used for communication. It is furthermore desirable that this circuit comprises only few components and can thus be implemented manually without tool support and without major design efforts.

The circuit presented in claim 1 provides the desired function. Advantageous embodiments and further developments are indicated in the sub-claims.

The data bus interface comprises a clock and a data line in which the beginning and the end of a data transmission, respectively, is indicated via unique combinations of states on the clock and data line. Moreover, an interface circuit is provided which ascertains, in the receiving mode, the states on the clock and the data line by scanning at a multiple of the data rate and outputs the transmitted data. A control circuit is provided to detect beginning and end of the data transmission, wherein after detecting beginning of a data transmission, the control circuit applies to the interface circuit a clock which is required for the operation of the interface circuit. After detecting the end of a data transmission, the control circuit interrupts the clock required for the operation of the interface circuit.

The control circuit is preferably designed as a state machine which reacts, without needing clock signals, to the states on the clock and data line.

The circuit according to the invention includes a control block and a logic AND gate. Depending on a control signal issued by the control block, the logic AND gate transmits to the interface circuit the clock required for the operation of the interface. Furthermore, the data and clock line of the interface are supplied to the control block. The control block can furthermore be supplied with the clock line and a reset line. The reset line is used to set the circuit into a defined state. During operation, the control block continuously monitors the data and clock line of the interface. When an external device connected to the interface indicates a data transmission on the interface, the control block applies a control signal to the logic AND gate which thereupon transmits the clock—which is also applied to the gate—to the interface circuit. After the data transmission is terminated, the clock for the interface circuit is shut off again by the control signal. In one embodiment of the circuit according to the invention, the control block transmits a control signal to the interface circuit which effects a reset of the interface circuit into a defined state. The control signal can be the same signal which is supplied to the logic AND gate. The control block ensures that the interface circuit is supplied with the clock required for operation for as long as the data transmission will take. In this case, the control block detects beginning and end of the data transmission. The interface circuit only needs to receive and acknowledge the transmitted data.

A method according to the invention for controlling a data bus interface with a clock and a data line (SCL, SDA) includes the steps of detecting beginning of a data transmission and applying a clock signal to receiving and transmitting circuitry upon detecting beginning of a data transmission. Once the data transmission is initiated and running, termination of the data transmission is detected. Upon detection of termination of the data transmission the clock signal is removed from receiving and transmitting circuitry. In one embodiment, detecting beginning and termination of a data transmission includes monitoring logic states or state transitions of a data and/or clock line. In one embodiment applying and removing a clock signal includes controlling a switch or multiplexer that conducts or interrupts the clock signal. The switch may also include a logic AND-gate or a logic OR-gate, or other suitable logic gates.

The invention is described below with reference to the drawing. In the drawing

In the Figures, identical or similar elements are provided with the same reference symbols.

Figure 1:
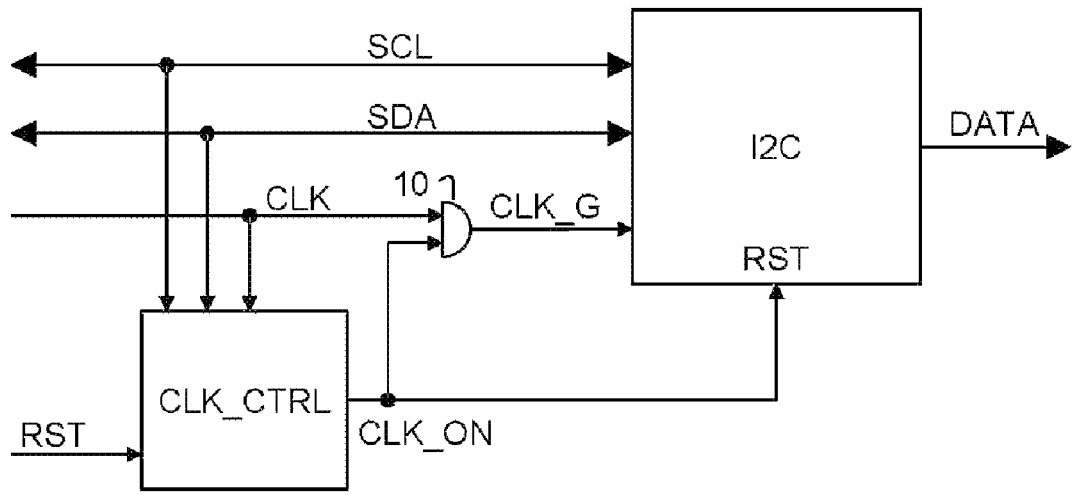
FIG. 1 shows a schematic overview of the components of the circuit according to the invention.

FIG. 1 shows a schematic presentation of the circuit according to the invention with a control block CLK_CTRL, a logic AND gate 10 and the interface circuit I2C. A clock line SCL and a data line SDA are connected to the interface circuit I2C. The clock line SCL and the data line SDA are, moreover, also supplied to the control block CLK_CTRL. Furthermore, the control block CLK_CTRL is supplied with a clock CLK via a corresponding clock line. A reset line RST is provided for setting the circuit into a defined state. An output signal CLK_ON of the control block CLK_CTRL is supplied to the logic AND gate 10 and the interface circuit I2C. The clock signal CLK is also applied on a second input of the logic AND gate 10. The control block CLK_CTRL monitors the clock and data lines SCL and SDA. Beginning and end of a data transmission are indicated by defined states on the clock and data lines SCL and SDA. When an externally initiated data transmission is detected, the output CLK_ON of the control block CLK_CTRL assumes a state which results in the clock signal CLK applied to the logic AND gate 10 being applied as a switched clock signal CLK_G to the interface circuit I2C. At the end of a data transmission, the output CLK_ON assumes a state which causes the logic AND gate 10 to block clock CLK, i.e. the switched clock signal CLK_G is no longer applied to the interface circuit I2C. In the schematic circuit shown in FIG. 1, the output signal CLK_ON is also connected with a reset input of the interface circuit I2C. This ensures that the elements of the interface circuit I2C are set into a defined state at the beginning of every new data transmission. On the other hand, the interface circuit I2C does not yet have any clock at the beginning of a data transmission to scan the data lines SCL and SDA. Furthermore, the clock signal could already be switched off again before the interface circuit I2C has detected the defined states on the data lines SCL and SDA which indicate an end of the data transmission. The control block CLK_CTRL takes charge of the detection of the beginning and the end of the data transmission and keeps the interface circuit I2C in reset until a data transmission is present.

Figure 2:
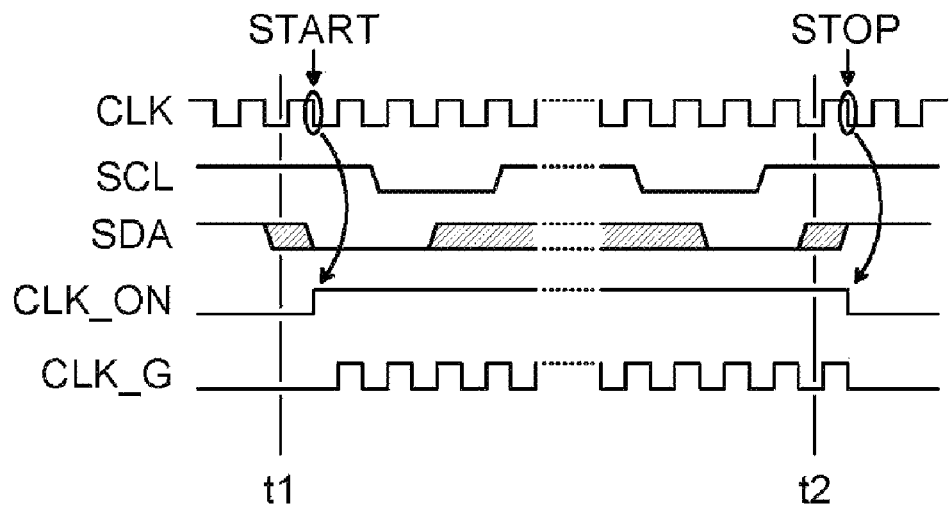
FIG. 2 shows a schematic presentation of the signal states at the beginning and the end of the data transmission via the I2C bus.

FIG. 2 is a schematic presentation of the corresponding signal states on the data line SDA and the clock line SCL of the interface I2C, on the output CLK_ON of the control block CLK_CTRL, and of the clock signal CLK_G applied to the interface circuit I2C, as they occur in connection with the circuit according to the invention. The signal states presented in FIG. 2 are shown with reference to the clock signal CLK. On the left hand side of the diagram, the signal states on the data line SDA and the clock line SCL are presented which indicate the beginning of a data transmission. With the I2C bus initially mentioned already, the beginning of a data transmission is indicated by a logic high level on the clock line SCL and a logic low level on the data line SDA, while both lines have a logic high level in the idle state. Thus, the falling edge of the data line SDA indicates the beginning of a data transmission. However, the beginning of the data transmission is not necessarily synchronous with the clock CLK. The circuit according to the invention only transmits the clock signal CLK as a switched clock signal CLK_G to the interface circuit I2C when the clock signal CLK has a falling edge. To this end, the output signal of the control block CLK_CTRL assumes a logic high level only at the falling edge of the clock signal CLK. The logic high level has the effect that the interface circuit I2C is not held any longer in the reset. This will accordingly enable the interface circuit I2C to go over from the reset state into the operating state and, moreover, the clock signal CLK_G will then be securely applied to the interface circuit I2C. In other words, a fixed time corresponding to the length of one half clock cycle will be available between canceling the reset and the next rising edge of the clock signal CLK_G. The right side of the diagram presents the signal states on the data line SDA and the clock line SCL which indicate the end of a data transmission. With the I2C bus, the end of a data transmission is indicated by a rising edge on the data line SDA while the clock signal line SCL has a logic high level. Similar to the detection of the beginning of a data transmission, the switched clock signal CLK_G to the interface circuit I2C is switched off with the next falling edge of the clock signal CLK after the end of the data transmission has been detected. Thus, a complete last clock cycle is made available to the interface circuit I2C. The above described timing relates to an interface circuit I2C in which the rising edge of the clock is decisive. With an interface circuit in which the falling edge of the clock were decisive, the cancellation of the reset and the transmission of the clock signal CLK would accordingly be done with the rising edge of the clock signal CLK.

Figure 3:
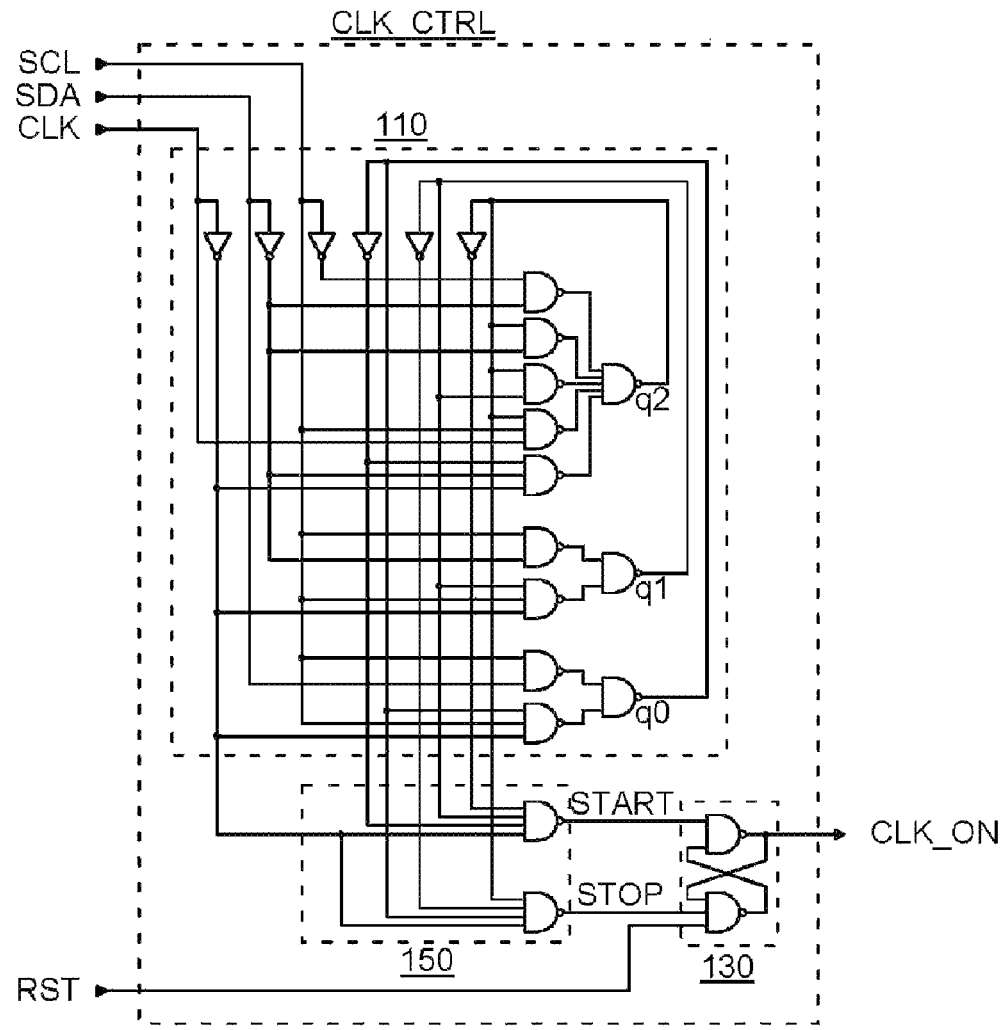
FIG. 3 shows a schematic presentation of a first embodiment of a control block according to the invention.

FIG. 3 presents an exemplary schematic circuit diagram of a control block CLK_CTRL according to the invention. The signals SCL, SDA and CLK, as well as a reset signal RST are supplied to the control block CLK_CTRL. The control block CLK_CTRL comprises an asynchronous state machine 110, a start/stop decoder 150, and a flip-flop 130. An output CLK_ON indicates that the beginning or the end of a data transmission was detected. The asynchronous state machine 110 analyzes the signals SCL, SDA and CLK applied to it according to the combinatorial analysis determined by its logic circuit elements. In contrast to a synchronous state machine, an asynchronous state machine comprises a logic network with combinatorial feedback signal paths. No clocked storage elements which store the state variables are required. Rather, the states are represented by output signals of the combinatorial functions according to the input signals of the state machine and the feedback signals of the logic circuit elements. In the state machine according to the invention, the state variables are represented by the outputs q0, q1 and q2 of the logic circuits. Changes in the states can only occur if there are changes on one or a plurality of the input signals. A change on one of the input signals can effect, via the network, changes on the outputs q0, q1 or q2. In the circuit presented in FIG. 3, the clock signal CLK is no clock required for the operation of the circuit but rather a normal input signal like the inputs of the data and clock line SDA and SCL.

Figure 4:
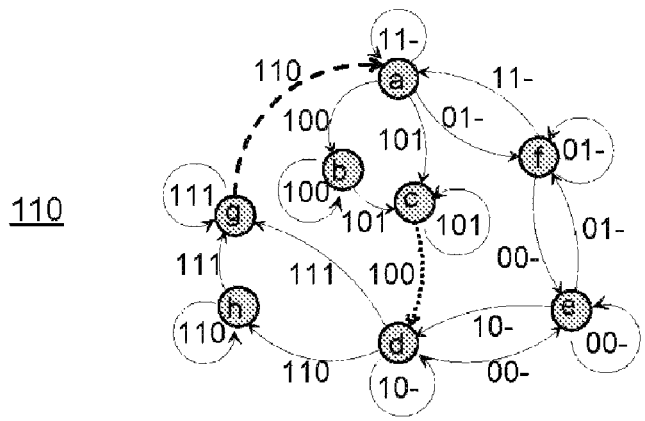
FIG. 4 shows a state diagram of the different states of the control block.

FIG. 4 presents a state diagram of the state machine which, in the control block CLK_CTRL, provides for the detection of the beginning and the end of the data transmission. When read from left to right, the groups of digits next to the arrows represent the states on the input signals SCL, SDA and CLK. A dash in place of a signal indicates that this signal has no effect on the state. The arrows signalize state changes. The letters a to h in the gray colored circles present those states which the state machine according to the invention can adopt. The initial state is in this case the state with the letter a. When the signals SCL and SDA show a logic high level—i.e. no data transmission is indicated—the state machine will remain in state a. The state of signal CLK is irrelevant. When signals SCL and SDA indicate the beginning of a data transmission, the state of the signal CLK will be of importance. When signal CLK has a logic high level, the state machine changes into state c. Otherwise, the state machine changes to state b and waits for signal CLK to make a transition from the logic low level to the logic high level. Only thereafter, the state machine will change to state c. In state c, the beginning of a data transmission is detected, and the state machine is waiting for a falling edge of the clock signal CLK for unblocking clock CLK_G to the interface circuit I2C. Unblocking of clock CLK_G will be triggered by the transition from state c to state d. In FIG. 4, this transition is presented by the dotted arrow. The signal START—generated by the decoder 150 shown in FIG. 3—which in the active state has a logic low level sets the flip-flop 130 shown in FIG. 3. Thereupon, flip-flop 130 has at its output a logic high level which unlocks the clock CLK_G to the interface circuit I2C via the AND gate 10 shown in FIG. 1. Flip-flop 130 is controlled by the state change at the output of the NAND gate of the decoder 150. The NAND gate only switches when there is state c together with a logic low level on the clock line CLK. As shown in FIG. 3, the upper three inputs of the NAND gate are connected with the inverted outputs q0 and q2 as well as with the non-inverted output q1 of the state machine 110. The NAND gate thus decodes, with the upper three inputs, the state c which is presented by the string of digits 010. The fourth input of the NAND gate is connected with the inverted clock signal CLK. When the state machine changes to state c, the clock signal CLK has a logic high level, as stated above. As a result, decoding has not yet been completed. This will only then be the case when the clock signal CLK has a logic low level. At that time, the state machine changes from state c to state d, and compensation and transient actions are going on in the network. After fading of the transient actions, signals are applied to the inputs of the NAND gate which are no longer corresponding to the decoding condition, and the signal START assumes a logic high level again. It is thus apparent that the transition from state c to state d generates a pulse with a logic low level of a length ΔT; ΔT being equivalent to the duration of the transient action. The pulse sets the flip-flop 130 presented in FIG. 3.

The table below presents the different states of the state machine and the corresponding logic levels at the outputs q0, q1 and q2.

| State | q2 | q1 | q0 |
|---|---|---|---|
| a | 0 | 0 | 1 |
| b | 0 | 1 | 1 |
| c | 0 | 1 | 0 |
| d | 1 | 1 | 0 |
| e | 1 | 0 | 0 |
| f | 0 | 0 | 0 |
| g | 1 | 0 | 1 |
| h | 1 | 1 | 1 |

When considering the coding of the different states, it is conspicuous that, for a transition from state c to state d, only the output q2 needs to change. Outputs q0 and q1 remain unchanged. This coding of the states allows to generate a clean trigger pulse since missing pulses—due to run-time differences between several relevant signals—cannot occur in this transition. Furthermore, the selection of the state coding as well as the design of the circuit ensures that the state c cannot even unintentionally be reached through transient changes of states within the circuit.

After state d has been reached, it will be begun to transmit data on the I2C bus. The transmission begins with the signal SCL assuming a logical low level. The state machine thereupon changes to state e. According to the I2C bus specification, the signal SDA may only change its logic level during the data transmission when the signal SCL has a logic low level. Depending on the transmitted data, the state machine assumes the states d, e, f and a. States d and e occur when a 0 (zero) is transmitted. States f and a occur when a 1 (one) is transmitted. As is evident in the state diagram in FIG. 4, the clock signal CLK which is applied to the interface circuit for operation is without importance for the state machine during the transmission of data via the bus.

As shown in FIG. 2, the data transmission via an I2C bus will be terminated by the so-called stop condition. To initiate the stop condition, the data line SDA must be set to a logic low level while the clock line SCL has a logic low level. The state machine is thereby changed to state e. Thereafter, the clock line SCL is set to a logic high level, due to which the state machine is forced into state d. A stop condition is present if the data line SDA now also transfers from a logic low level to a logic high level. Similar to the start condition which must exist at the beginning of a data transmission, the transition of the state machine to the next state—g or h—will depend on the clock signal CLK. If the clock signal CLK had a logic high level upon leaving state d, the state machine is waiting in state g for the falling edge of the clock signal CLK before the signal STOP is generated in the decoder 150. Only then will the flip-flop 130 be reset, and the signal CLK_ON interrupts the transmission of the clock signal CLK to the interface circuit I2C.

Figure 5:
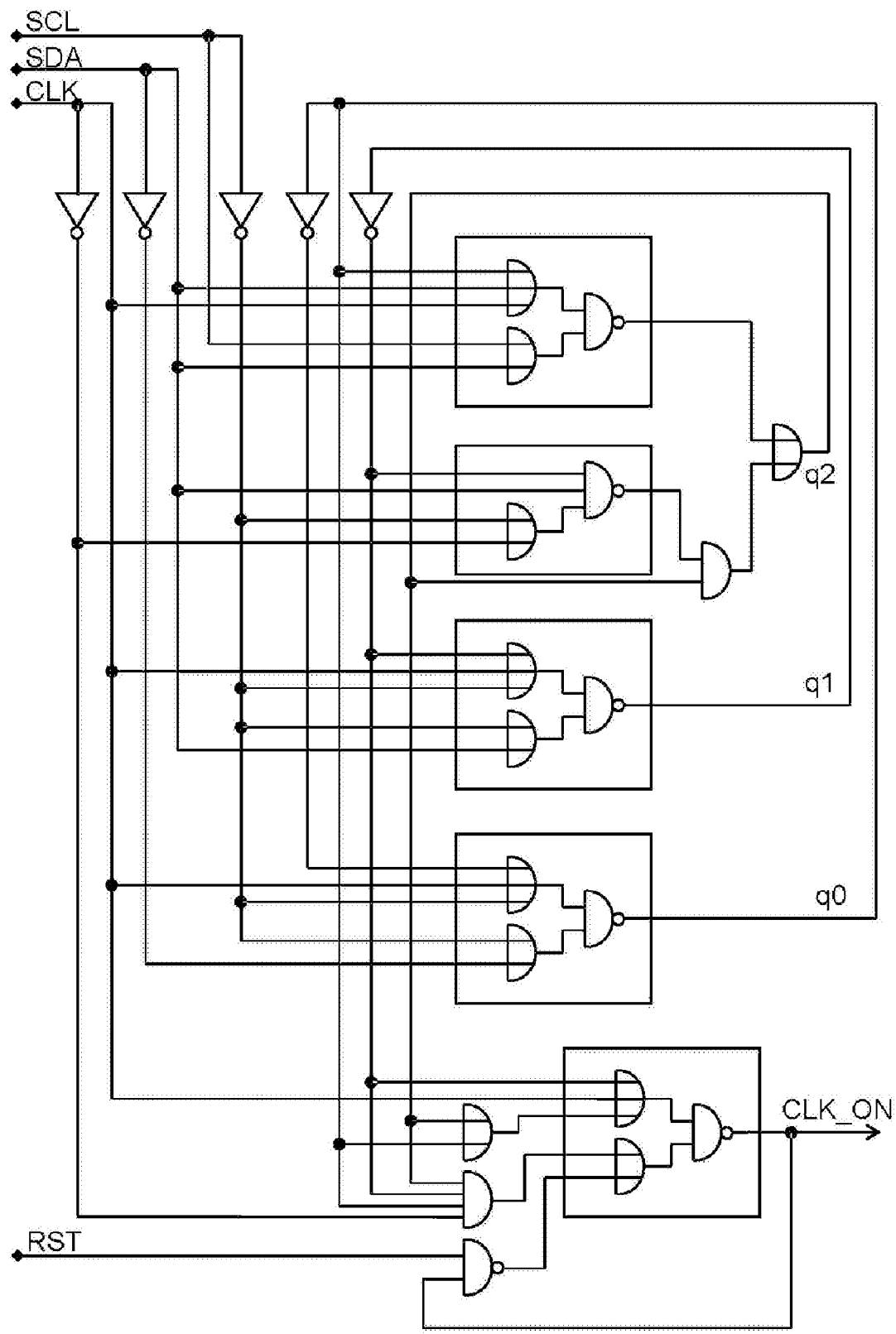
FIG. 5 shows a schematic presentation of a second embodiment of a control block according to the invention.

FIG. 5 presents a schematic circuit diagram of an alternative exemplary control block CLK_CTRL according to the invention. In the control block CLK_CTRL presented in FIG. 3, the required logic operations are represented by their respective basic circuits. However, when producing circuits, it may be advantageous to reduce the number of the different basic circuits used. For example, AND and OR gates can be replaced by NAND gates. The resulting circuit can then be assembled advantageously by predefined circuit elements which are available in the libraries of the design tools—used and/or available by the IC manufacturers—which are used for producing digital circuits. For the circuit shown in FIG. 5, some of the circuit elements shown in FIG. 3 were replaced by such pre-defined circuit elements. Solid-line frames around individual logic basic circuits here show that it is a pre-defined circuit element from a library.

The invention claimed is:

1. A data bus interface with a bus clock line and a bus data line, in which beginning and end of a data transmission, respectively, is indicated by unique state combinations of the bus clock line and the bus data line, wherein an interface circuit is provided, which, in a receiving mode during active communication, ascertains states of the bus clock line and the bus data line by sampling the states of the bus clock line and the bus data line with a multiple of a clock rate of the bus clock line and outputs received data, wherein a control circuit is provided for detecting the beginning and the end of the data transmission, wherein the control circuit applies—after detecting the beginning of a data transmission—to the interface circuit a first clock signal, having a multiple of the clock rate of the bus clock line, which first clock signal is required for the operation of the interface circuit, and wherein the control circuit interrupts—after detecting the end of the data transmission—the first clock signal, wherein the control circuit is adapted to switch the first clock signal at an opposite slope of a decisive slope of a sampling stage of the interface circuit, whereby a fixed time is available before and after the data transmission for setting up and completing the transmission, and wherein applying and/or interrupting of the first clock signal takes place synchronously with a second clock signal, with the first clock signal being derived from the second clock signal.

2. The data bus interface of claim 1, wherein the control circuit analyzes the states of the bus clock line and the bus data line for detecting the beginning or end of a data transmission.

3. The data bus interface of claim 1, wherein the control circuit comprises an unclocked state machine.

4. The data bus interface of claim 1, wherein the control circuit applies a reset signal to the interface circuit.

5. The data bus interface of claim 1, wherein an external reset signal is supplied to the control circuit.

6. A method of controlling a data bus interface with a bus clock line and a bus data line, in which interface, during active communication, a sampling stage of a receiving circuitry samples the bus clock line and bus data line at a multiple of a clock rate of the bus clock line of the data bus interface, and wherein the receiving stage outputs the received data, including the steps of:

detecting beginning of a data transmission;
 applying a first clock signal having a multiple of the clock rate of the bus clock line of the data bus interface to the receiving circuitry upon detecting beginning of the data transmission, wherein the begin of the data transmission is indicated by a first unique state combination of the bus clock line and the bus data line;
 detecting termination of the data transmission, wherein the termination of the data transmission is indicated by a second unique state combination of the bus clock line and the bus data line;
 removing the first clock signal from the receiving circuitry upon detecting the termination of the data transmission, wherein the first clock signal is applied and removed at an opposite slope of a decisive slope of the sampling stage of the receiving circuitry, whereby a fixed time is available before and after the data transmission for setting up and completing the transmission, wherein applying and removing the first clock signal includes controlling a switch that conducts or interrupts the first clock signal.

7. The method of claim 6, wherein detecting beginning and termination of the data transmission includes monitoring logic states or state transitions of the bus data line and/or the bus clock line.

* * * * *